(12) United States Patent
Kreisel et al.

(10) Patent No.: US 10,902,522 B1
(45) Date of Patent: Jan. 26, 2021

(54) INTER-FRAME COMMUNICATION

(71) Applicant: Guidewire Software, Inc., Foster City, CA (US)

(72) Inventors: Raymond Timothy Kreisel, Mountain View, CA (US); Mike Burn, San Francisco, CA (US)

(73) Assignee: Guidewire Software, Inc., San Mateo, CA (US)

( * ) Notice: Subject to any disclaimer, the term of this patent is extended or adjusted under 35 U.S.C. 154(b) by 304 days.

(21) Appl. No.: 14/167,935

(22) Filed: Jan. 29, 2014

Related U.S. Application Data

(60) Provisional application No. 61/913,201, filed on Dec. 6, 2013.

(51) Int. Cl.
G06Q 40/08 (2012.01)

(52) U.S. Cl.
CPC .................. G06Q 40/08 (2013.01)

(58) Field of Classification Search
CPC ...................................... G06Q 40/08
See application file for complete search history.

(56) References Cited

U.S. PATENT DOCUMENTS

| | | | |
|---|---|---|---|
| 6,674,849 B1 | 1/2004 | Froeberg | |
| 8,347,083 B1 * | 1/2013 | Scudder | H04L 63/0435 713/159 |
| 8,595,752 B1 | 11/2013 | Fioravanti | |
| 8,689,099 B1 | 4/2014 | Hanni | |
| 8,739,123 B2 | 5/2014 | Appleton | |
| 8,850,473 B2 | 9/2014 | Sheehan | |
| 9,786,010 B2 | 10/2017 | Kiper | |
| 2002/0083154 A1 | 6/2002 | Auffray | |
| 2002/0171650 A1 | 11/2002 | Prabhakaran | |
| 2003/0067480 A1 * | 4/2003 | Gao | G06F 17/30899 715/733 |
| 2005/0246295 A1 | 11/2005 | Cameron | |
| 2006/0100912 A1 | 5/2006 | Kumar | |
| 2006/0212803 A1 * | 9/2006 | Arokiaswamy | G06F 17/30893 715/201 |
| 2007/0016434 A1 | 1/2007 | Oppenheimer | |
| 2008/0301643 A1 * | 12/2008 | Appleton | G06Q 30/02 717/124 |

(Continued)

FOREIGN PATENT DOCUMENTS

WO    WO 2013/035089 A2 *  3/2013

OTHER PUBLICATIONS

Adam Barth et al., Securing Frame Communication in Browsers, (Year: 2009).*

(Continued)

Primary Examiner — Viet D Vu
Assistant Examiner — Mohammad Yousuf A. Mian
(74) Attorney, Agent, or Firm — Van Pelt, Yi & James LLP

(57) ABSTRACT

A technique of inter-frame communication during an insurance related workflow includes receiving from a client a request to provide content that is renderable on the client, the content including code used to invoke a third party engine and to render results from the third party engine on the client in a child frame that is embedded in a parent frame. It further includes obtaining the content. It further includes sending the content to the client to be rendered in the child frame.

17 Claims, 8 Drawing Sheets

(56) References Cited

U.S. PATENT DOCUMENTS

| | | |
|---|---|---|
| 2008/0301727 A1 | 12/2008 | Cristofalo |
| 2009/0047972 A1 | 2/2009 | Neeraj |
| 2009/0292464 A1 | 11/2009 | Fuchs |
| 2009/0299862 A1* | 12/2009 | Fan .................... G06Q 30/0277 |
| | | 705/14.73 |
| 2010/0174564 A1 | 7/2010 | Stender |
| 2010/0262668 A1 | 10/2010 | Piett |
| 2011/0022730 A1 | 1/2011 | Appleton |
| 2011/0040589 A1 | 2/2011 | Nielsen |
| 2011/0274258 A1* | 11/2011 | Casalaina ............ H04L 12/589 |
| | | 379/93.01 |
| 2012/0009900 A1 | 1/2012 | Chawla |
| 2012/0022896 A1 | 1/2012 | Jayaram |
| 2012/0059812 A1 | 3/2012 | Bliss |
| 2012/0066296 A1 | 3/2012 | Appleton |
| 2012/0084641 A1* | 4/2012 | Chung ................. G06F 16/972 |
| | | 715/240 |
| 2012/0170797 A1 | 7/2012 | Pershing |
| 2012/0209782 A1 | 8/2012 | Pershing |
| 2012/0244885 A1 | 9/2012 | Hefetz |
| 2013/0024215 A1 | 1/2013 | Jayaram |
| 2013/0104035 A1 | 4/2013 | Wagner |
| 2013/0139044 A1 | 5/2013 | Iversen |
| 2014/0095974 A1* | 4/2014 | Cui ......................... G06F 21/53 |
| | | 715/234 |
| 2014/0172974 A1 | 6/2014 | Baldwin |
| 2015/0100552 A1 | 4/2015 | Malis |
| 2015/0127411 A1 | 5/2015 | Hoen, IV |
| 2015/0199318 A1* | 7/2015 | Lemonik ............ G06F 9/44526 |
| | | 715/255 |
| 2016/0169693 A1 | 6/2016 | Barcklay |

OTHER PUBLICATIONS

Raj Bandi. "IFrame Cross Domain Communication Using IIS ARR and URL Rewrite", May 1, 2018. Downloaded Dec. 20, 2018 from IFrame Cross Domain Communication Using IIS ARR and URL Rewrite.

Steve Liles. "Cross-domain inter-frame communication in javascript", Feb. 5, 2013. Downloaded Dec. 20, 2018 from http://steveliles.github.io/cross_domain_inter_frame_communication_in_javascript.html.

* cited by examiner

[Hidden Item – Example Outbox JSON Object]

```
<input type="hidden" name="ViewPointFinderPopup:iframeParamsID"
id="ViewPointFinderPopup:iframeParamsID" label="Parameters"
value="{"appName":"ClaimCenter","allowEdit":"false","appusername":"aapplegate","address":"600-698
Congress Alley,Louisville, KY 40202","appVersion":"6","description":"Insured hit other party's car on the front
passenger side while making a left turn.","zoom":"15","longitude":"-
85.76088","latitude":"38.25498","language":"en","pcfName":"ViewPointFinderPopup","claimNumber":"235-
53-365870"}" onchange="if (EventHandlers.valueChanged(event, this)==false) return false;"
delayonchange="false">
```

FIG. 6

INTER-FRAME COMMUNICATION

CROSS REFERENCE TO OTHER APPLICATIONS

This application claims priority to U.S. Provisional Patent Application No. 61/913,201 entitled INTER-FRAME COMMUNICATION filed Dec. 6, 2013 which is incorporated herein by reference for all purposes.

BACKGROUND OF THE INVENTION

Augmenting existing applications with applications and services hosted in the cloud has become increasingly popular. However, for browser-based applications, integrating applications hosted in the cloud into existing on-premises applications can result in cross-domain and interframe communication issues. For example, if two frames in a browser window point to computers on two different Internet domains, and the frames are allowed to communicate with each other (i.e., interframe communications), malicious attackers may attempt to exploit the communication channel in order to perform nefarious activities, such as infecting computers on one domain by passing viruses from the other domain.

BRIEF DESCRIPTION OF THE DRAWINGS

Various embodiments of the invention are disclosed in the following detailed description and the accompanying drawings.

FIG. 6 is a diagram illustrating an embodiment of a hidden item.

DETAILED DESCRIPTION

Figure 1:
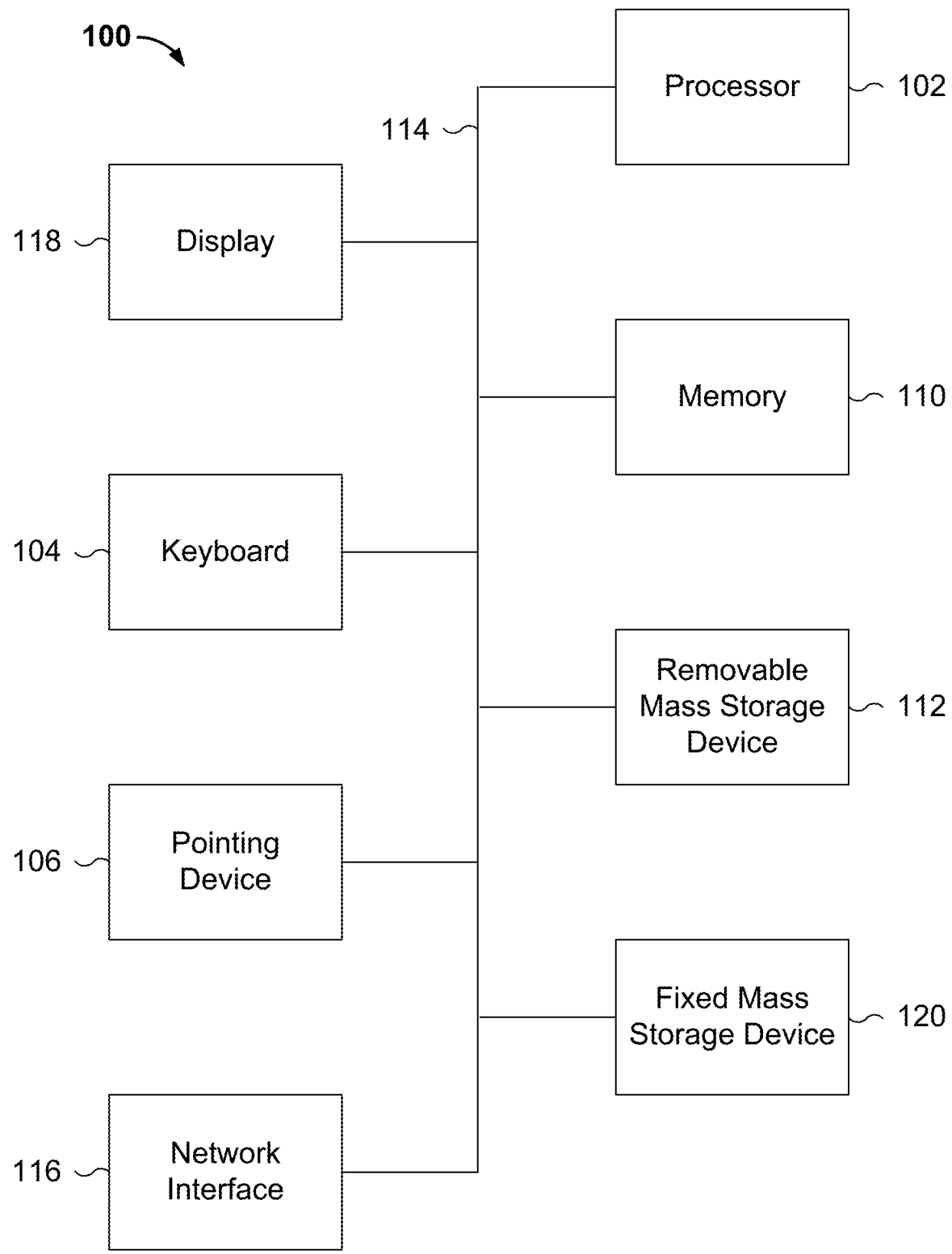
FIG. 1 is a functional diagram illustrating an embodiment of a programmed computer system for inter-frame communication.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In existing systems, because of security concerns, communication between two frames of a browser window that point to web documents hosted on different Internet domains is typically not allowed. As an example, in an insurance-related scenario, an insurance adjustor for an insurance carrier processes a claim by accessing, via a web browser, an on-premises insurance claim processing application that is hosted on an Internet domain belonging to the insurance carrier. Via the browser window, the insurance adjustor is displayed a user interface (UI) that allows the insurance adjustor to perform various transactions that are a part of the claim processing workflow. One of the transactions to be performed by the insurance adjustor as part of the claim processing workflow includes creating a loss location for the claim being processed. In order to provide an accurate determination of the loss location, the insurance adjustor would like to invoke, from within their browser window and inline with the claim processing workflow being displayed, a mapping application that is hosted in the cloud on an Internet domain different from the Internet domain of the insurance carrier. While the browser window can be configured to display two different frames (e.g., HTML iframe elements), with one pointing to the domain of the insurance carrier hosting the on-premises claim application and the other to the domain hosting the mapping application, thus configured, the same browser window would include two frames that point to different Internet domains. Typically, communication between such frames is not allowed by browsers, as nefarious individuals can exploit the interframe communication by attacking a computer on one Internet domain from a computer on the other Internet domain.

Disclosed herein are techniques for secure inter-frame and cross-domain communications. For example, using the techniques disclosed herein, from within a single browser window, a transaction can be performed across multiple Internet domains, with cloud-hosted external services (e.g., third party mapping engines, collision estimation engines, etc.) seamlessly integrated into an existing insurance-related workflow running on an on-premises insurance application. For purposes of illustration, insurance-related examples are provided below, but the system described herein may be implemented in other contexts as well.

FIG. 1 is a functional diagram illustrating an embodiment of a programmed computer system for inter-frame communication. As will be apparent, other computer system architectures and configurations can be used to facilitate inter-frame communication. As will be apparent, other computer system architectures and configurations can be used to generate insurance quotes. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to facilitate inter-frame communication.

Processor 102 is coupled bi-directionally with memory 110, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100 and is coupled either bi-directionally (read/write) or uni-directionally (read only) to processor 102. For example, storage 112 can also include computer readable media such as magnetic tape, flash memory, PC-CARDS, portable mass storage devices, holographic storage devices, and other storage devices. A fixed mass storage 120 can also, for example, provide additional data storage capacity. The most common example of fixed mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer readable medium is any data storage device that can store data which can thereafter be read by a computer system. Examples of non-transitory computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
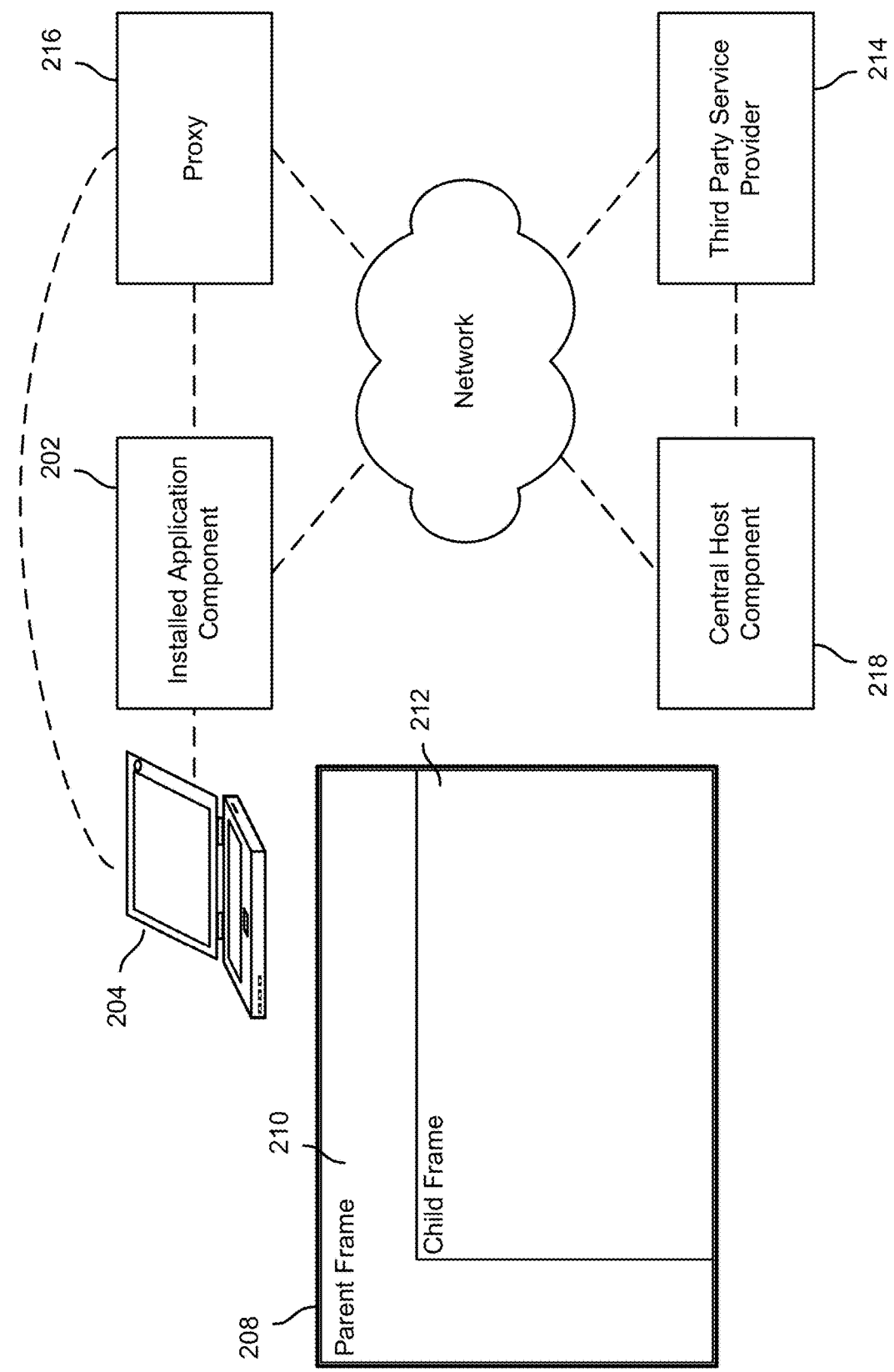
FIG. 2 is a diagram illustrating an embodiment of a system for inter-frame communication.

FIG. 2 is a diagram illustrating an embodiment of a system for inter-frame communication. In the example shown, an insurance platform service provider/vendor such as Guidewire™ provides and/or implements installed application component 202 at the site of a customer of the platform provider (e.g., insurance carrier that is a customer of Guidewire™) The installed application component is a core application system that includes a suite of one or more insurance applications that provide and support various core insurance processing operations, such as underwriting, policy administration, billing, claims management, etc. In some embodiments, the applications are on-premises software installed on the premises/site of the customer (e.g., installed on one or more servers on a network operated by the customer). The insurance platform service vendor can have multiple customers (e.g., peer insurers), each of which has installed a respective on-premises application component.

In some embodiments, a user, such as an insurance adjustor, accesses the applications included in installed application component 202 via client device 204 (e.g., laptop, desktop, tablet, smartphone, or any other appropriate terminal) to run and perform various transactions as part of insurance processing workflows. In some embodiments, the installed on-premises applications are browser-based applications executing on a server device providing functions to the client, and the client is a thin client that uses a browser-based user interface to access the installed applications. The browser-based applications can be accessible under a particular domain (e.g., domain of the insurer that the installed application component is associated with), with a user accessing the applications by directing a browser (e.g., Google Chrome™, Mozilla Firefox™, Microsoft Internet Explorer™, etc.) to an address that is on the domain. The installed application component can then provide logic/instructions/code to the user's browser (or the browser client can include application logic) for rendering an appropriate page (e.g., HTML page) in a browser window of the client device in order to run the browser application and perform insurance-related workflows and transaction processing.

In the example shown, the workflows and transaction processing supported by the insurance application suite of the installed application component can be augmented/integrated with external elements (e.g., third-party services, engines, applications, etc.) that are hosted and/or managed by central host component 218. In some embodiments, an additional user interface (UI) component that is renderable on the client for interacting with the third party element provided by an external domain is displayed in a client browser instance inline of a workflow process running on the on-premises domain.

In the example shown, browser instance 208 is invoked by and displayed on client 204, and is configured for cross-domain inter-frame communication during an insurance-related workflow. As part of the insurance workflow, a parent frame 210 of the browser instance is directed to a uniform resource locator (URL) on a domain associated with the installed application component (e.g., domain of an insurance carrier operating the application component) in order to load a page of an on-premises application for performing a workflow. For example, a parent frame can be directed to the URL of "www.acmeinsurance.com/claims" in order to access a claim processing workflow. The page load causes a UI for performing an insurance related workflow to be presented to the user. While performing the insurance-related workflow in the parent frame, a user of the browser instance UI invokes a third party service/application hosted on a domain different from that of the parent frame in order to introduce/integrate a new workflow element into the existing insurance-related workflow opened in the parent frame. As used herein, a work flow element refers to transaction processing component that is part of an insurance workflow. For example, the parent frame can be configured to render a claim processing workflow, while a new workflow element, such as a mapping service, claim estimation service, etc. can be invoked in a child frame and used as a part of the claim processing workflow. As one example, a mapping service can be used to perform a transaction for creating a loss location for a claim, with the use of the mapping service being an integrated element of the overall claim processing workflow. In this example, an child frame 212 embedded within the parent frame of the browser instance is configured to render an additional UI component configured to interact with a third party engine (214) and displaying, within the child frame, results of the interaction. In some embodiments, the child frame comprises a browser frame, such as an iframe HTML element of a browser window. Various iframes can be displayed/embedded within the same browser window instance, with each iframe pointing to a different html document (e.g., different web page/URL). In some embodiments, the third party engine is an engine (e.g., mapping engine, collision estimation engine, etc.) that is operated by an entity different from the entity operating the on-premises application installation. For example, an insurance carrier may have installed on-premises insurance-related applications that do not have mapping functionality natively built in, but the functionality of the on-premises applications can be extended to include mapping services by leveraging and communicating with a third-party mapping engine such as Google Maps™. The functionality of the third-party mapping engine can be made accessible via a UI component rendered in a child frame of the parent browser window. In some embodiments, initialization information/parameters to be used in rendering the iframe are prepared/packaged (e.g., into serialized JSON object) by the parent frame and placed in a hidden field (e.g., html text input field that has visibility turned off). In some embodiments, the object included in the hidden field is an extensible object.

In some embodiments, configuring the iframe includes setting the URL for the iframe. Typically, for security purposes, two frames within a single browser window that point to web documents on different domains are not allowed to communicate with each other (i.e., interframe communication is restricted). Thus, in some embodiments, instead of directing the iframe to a URL of the domain hosting the external service (e.g., central host component), the URL is set to a URL under the domain of the parent frame, where the initial page at the URL is configured to instruct a proxy (216) to make a remote proxy call on behalf of the iframe to a central host component (218), which is on a different domain from the parent frame, for content for rendering the page of the iframe. By doing so, the iframe and the parent frame are placed on the same domain, allowing for interframe communication, while the proxy allows for the iframe to be rendered using content requested from a different domain, permitting secure cross-domain communication. For example, both a parent frame and child frame can be directed to URL/web documents that are under the same Internet domain of an insurance carrier, but while the parent frame is displaying an on-premises claim application hosted on the domain of the insurance carrier, the child frame can be rendered to display an external mapping service according to code that is hosted on a different domain, as the proxy can be configured to make remote calls for the rendering code from the different domain on behalf of the child frame. An example in which a proxy is used to facilitate secure interframe and cross-domain communications is discussed below in connection with FIGS. 5A and 5B.

In some embodiments, the iframe receives customized rendering code (e.g., combination of javascript and html) that is generated by the central host component and received via the proxy. In some embodiments, the customized rendering content includes any licenses, Application Programming Interface (API) code, etc. for interacting with and making calls to a third party engine. In some embodiments, the customized rendering code includes mashup code that combines various elements (such as API elements, functions, etc.) to create the customized application that is available via the iframe. The customized rendering code is used to render the iframe. In some embodiments, the rendering code uses initialization parameters stored in an object included in a hidden field of the parent frame to render the iframe, and the rendering code is configured to unpackage the object to retrieve the parameters (e.g., deserialize JSON object in hidden field). In some embodiments, the hidden field of the parent frame is a secure location/staging area known by both frames for communicating between the two frames. In some embodiments, a key is required to access the hidden field. An example in which a hidden field is used to facilitate secure interframe and cross-domain communications is discussed below in connection with FIGS. 5A and 5B.

After the base iframe is rendered and initialized, the user can then interact with the new workflow element to utilize the functionality of the third party engine. In some embodiments, the results of the interaction in the iframe are communicated to the parent frame to be applied to the insurance-related workflow (e.g., insurance claim processing workflow) open in the parent frame. In some embodiments, a second hidden field (e.g., hidden inbox) is used to communicate from the iframe to the parent frame. In some embodiments, the hidden inbox is updated in real-time as the user interacts with the third-party engine and updated results are returned. In some embodiments, one-directional hidden fields (i.e., hidden inbox and hidden outbox) are used as secure communication channels for interframe communication. Any number of hidden fields can be used to facilitate communication between the parent and child frames.

In some embodiments, when the user has completed use of the third party application provided in the iframe, the results of the interaction are applied to the insurance workflow open in the parent frame. For example, the information stored in the hidden inbox by the iframe can be extracted and unpackaged by the parent frame and applied to an open transactional object (e.g., insurance claim object). In some embodiments, the extracted information is applied to the transactional object in memory. This can be done so that changes to transactional objects do not become legally bound (e.g., committed to database). For example, while a loss location creation transaction is performed for a claim, which is represented using a claim data object, any new information to be applied to the claim object (e.g., loss location address, description, etc.) is applied to the claim object in memory (e.g., so that the claim object can continue to be worked on), as committing the changes to a claim object in a records database, can cause the claim object to become legally bound.

In the example shown, central host component 218 is configured to host services/applications or any other appropriate element to be integrated with the workflow/transaction processing of the on-premises insurance suite applications included in the installed application component. In some embodiments, the central host component is operated by the same vendor that supplied the installed application component, thereby forming a trusted relationship between the two components. In some embodiments, the central host component is implemented on an elastic service such as Amazon Web Services (Amazon AWS) that is highly available and resilient, having automatic fail, multiple data centers, etc. In some embodiments, the services/applications hosted by the central host component are owned by the operator of the central host component or by a different vendor. For example, the central host component can provide a custom mapping service to be integrated with insurance-related workflows that includes code using mapping technology from a third-party mapping engine service provider such as Google Maps™, where the owner of the central host component has obtained a license to use the third-party mapping engine. The custom rendering code can include code for interacting with the functionality of third party engine (e.g., making requests/queries via an API), processing the results, and displaying the results in a customized display to a user. An insurer that is a customer of the vendor operating the central host component can then subscribe to use the custom mapping service.

As described above, in some embodiments, the central host component is configured to generate and provide logic/code that extends the functionality of the on-premises insurance suite by integrating external third-party services and engines (e.g., third party mapping engines, third party collision estimation engines, etc.) into existing workflows. In some embodiments, the logic/code generated by the central host component is used to provide instructions for the iframe indicating how the iframe should be rendered. The logic/code content (e.g., a combination of javascript and html) provides hybridized transaction processing across multiple Internet domains within a single browser instance.

In some embodiments, the central host component is configured to communicate with proxy 216 to perform authentication and to communicate with the client via the proxy. In some embodiments, performing authentication includes receiving a request to invoke a service/application hosted by the central host component from the proxy on behalf of the client. In some embodiments, the request includes the credentials of the client/insurer (i.e., customer of service) associated with the on-premises insurance suite. The central host component is then configured to verify that the client is permitted to use a requested hosted service/application using the credentials (e.g., verifying that the insurer has subscribed to hosted service, that the insurer has access to a trial of the hosted service for a limited time, etc.). In some embodiments, if the client is authenticated and authorized to use the service, a one-time use token (or any other appropriate authentication mechanism) is provided to the client via the proxy. The central host component can host any number of services/applications to be integrated and shared among peer insurer customers/subscribers.

As described above, in some embodiments, customized rendering scripting code is also generated by the central host component and provided to the iframe of the client via the proxy in response to the client being authenticated. In some embodiments, the customized rendering script comprises code used to render the display of the iframe. As one example, the customized rendering code includes a combination of javascript and html as well as any licenses/keys that may be required to fetch the API (application programming interface) for a third party engine (e.g., API of mapping engine). In some embodiments, the customized rendering code is a mashup that includes custom code for combining and utilizing various API functions and elements (e.g., for making requests to a third party engine) to produce particular results. Thus, when the script is received by the iframe via the proxy and executed, an additional UI component can be rendered and initialized in the iframe of the client, allowing the client to interact with a custom service/application that is supported by a third party engine (e.g., mapping technology of Google Maps™ that is accessible via API calls). In some embodiments, the customized rendering script is obfuscated prior to being sent to the client to prevent the script from being read by an entity not authorized to receive and execute the script. In some embodiments, the customized rendering script includes the location of the hidden inbox/outbox of the parent frame from which the external service was invoked/requested, allowing for results from the third party engine to be communicated to the parent frame. As the central host component generates and manages the script logic to be sent to and executed by the client browser instance to run a hosted application, the central host component can handle upgrades to third party engines (e.g., new API for new functionality included in third party engine), without the on-premises insurance suite of the various peer clients that are using the shared service having to perform any updating of code. Additionally, as the central host component provides the applications to be integrated into the peer client installations and manages security, maintenance, upgrades, licenses, authentication, etc. required to utilize the third party engine, clients do not need to write custom code to include the new functionality, and the complexity in integrating, maintaining, updating, etc. the functionality is hidden from the client.

In some embodiments, the central host component is configured to track the requests made by clients to use services hosted by the central host component. For example, by tracking the credentials of the clients requesting the use of services, the central host component can perform auditing, monitoring, accounting, billing, etc. of the usage of the hosted services by each of requesting clients.

In some embodiments, the central host component maintains/manages licenses to use third party engines. When a client requests access to a hosted application that enables the use of third party engines to be leveraged (e.g., via API code supplied in the customized rendering script), the central host component also provides license keys so that the client is permitted to make API calls to the third party engine.

In some embodiments, proxy 216 is configured to act as a proxy on behalf of the browser window child frame to communicate with external domains, such as that of the central host component (as well as external third party engines), and to facilitate cross-domain communications (e.g., between the Internet domain of the on-premises insurance suite and the Internet domain of the central host component or external service) so that transaction processing can be spread across multiple domains. In some embodiments, the proxy is configured to receive a request to invoke a third-party engine. The proxy is configured to receive from a client a request to provide content that is renderable on the client, the content including code used to invoke a third-party engine and to read results from the third third-party engine on the client in a child frame that is embedded in a parent frame. In some embodiments, the proxy is configured to communicate with external third party engines on behalf of the child frame. For example, invocations/requests made from the child frame to be sent to a third party engine (e.g., API calls, etc.) such as Google Maps™ can be sent to the proxy, which in turn forwards the requests to the third party engine on behalf of the child iframe. Similarly, information received from the third party engines to be sent to the child frame (e.g. as contents of the child frame) is delivered/supplied to the child frame via the proxy.

As described above, rather than have an iframe embedded within the parent frame of the client browser point to an external domain, the iframe instead is directed to a page located on the same domain as the parent frame (e.g., subdomain), and the proxy configured to perform remote proxy calls to the external domain on behalf of the iframe. In some embodiments, the proxy is configured to reach out to external services, query and fetch requested content, and provide the fetched content to the iframe, which can be used to render the iframe. Thus, from the perspective of the client browser, both frames of the browser instance are on the same domain, but by using the proxy, the iframe is able to be rendered using information retrieved from a different domain (without being directly pointed to the external domain), thereby providing cross-domain interframe communication. In some embodiments, the proxy comprises a proxy server that is a trusted and known component installed along with/as part of the installed application component supplied by the vendor to a customer. In some embodiments, the proxy also has a trusted relationship with the central hosted component (as they may both be provided and controlled by the same vendor), and the proxy is configured to communicate securely with the central hosted component.

In some embodiments, the proxy is configured to perform authentication between the client installed application component and the central hosted component. The authentication can include providing credentials to the central host component in order to verify that the insurer associated with the client on-premises installation is authorized to invoke/request a service/application hosted by the central host component. In some embodiments, if the on-premises installation is verified, a one-time use token is provided by the central host component to the proxy, which in turn passes the token to the client browser so that the client can utilize the hosted service. Any other appropriate protocol can be used.

In some embodiments, if the client is authenticated to use the service hosted by the central host component, the proxy is configured to receive content generated by the central host component that is to be passed to the iframe of the client browser instance. As described above, the content generated by the central host component includes customized rendering code for rendering the display of the iframe.

By using a proxy to perform remote calls and communication with an external domain (i.e., that of the central host component, as well as third party engines such as Google Maps™) that is different from the parent frame (i.e., domain of insurer and on-premises installation), the iframe can be allowed to point to the same domain as that of the parent frame, such that the parent and iframe are allowed to communicate with each other, while the proxy is configured to reach out to external domains to perform additional transaction processing and provide the information to the iframe to be rendered. Thus, the iframe is masked as being under the same domain as the parent frame, while executing the hosted script provided by a service on an external domain.

Figure 3:
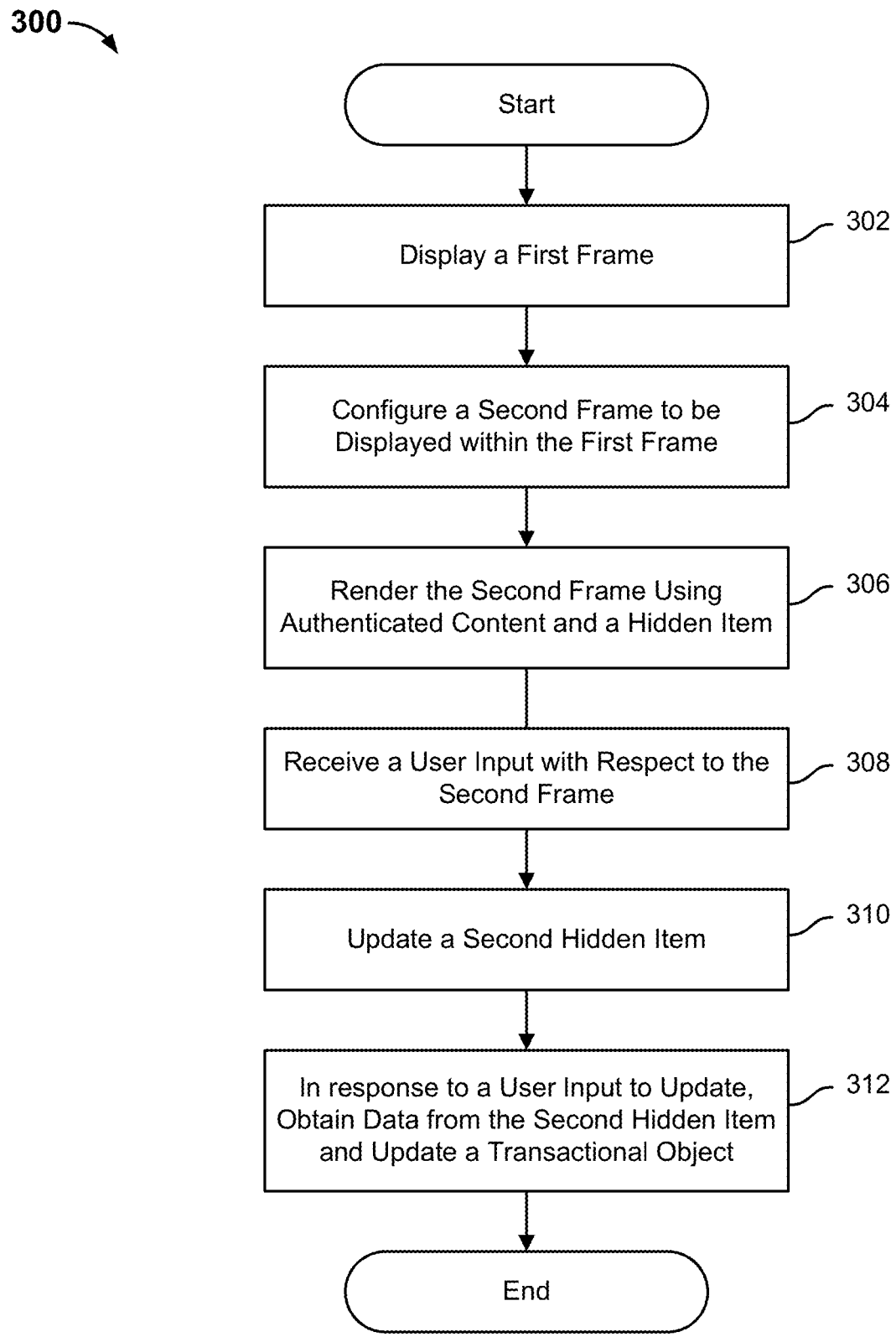
FIG. 3 is a flow diagram illustrating an embodiment of a process for inter-frame communication during an insurance-related workflow.

FIG. 3 is a flow diagram illustrating an embodiment of a process for inter-frame communication during an insurance-related workflow. In some embodiments, process 300 is performed by client 204 of FIG. 2. The process begins at 302 when a first frame is displayed. For example, the first frame can be a parent frame of a browser window of a thin client that is used to run a browser-based on-premises application operating on a first domain (e.g., domain of insurer associated with on-premises insurance suite). A user can run the application to perform a transaction by directing the browser to a URL (e.g., "acmeinsurance.com/claims") under the domain of the on-premises installation. For example, an insurance adjustor working on a claim process can direct the URL of their browser to an insurance claim application that is hosted on an Internet domain operated by the insurance carrier (e.g., "www.acmeinsurance.com") for whom the insurance adjustor works for.

At 304, a second frame to be displayed within the first frame is configured. In some embodiments, the second frame is an iframe embedded within in the first parent frame of the browser. The second frame is used to display and render an additional UI component for interacting with a service hosted on a domain that is different from the domain of the parent frame. In some embodiments, the second frame is directed to a URL (e.g., "acmeinsurance.com/maps") that is on the same domain of the parent frame to allow for/permit interframe communication between the first and second frames. For example, both the parent frame and child frame can be directed to URLs/web documents that are both hosted on a domain (e.g., "acmeinsurance.com") operated by an insurance carrier, with the parent frame pointed to a claim processing application (e.g., "www.acmeinsurance.com/claims") and the child frame point to a different page on the domain for invoking an externally hosted mapping service (e.g., "www.acmeinsurance.com/maps"). The second frame is then configured to use a proxy to communicate with an external domain (that is different from the domain associated with the parent frame) on its behalf.

In some embodiments, the second frame is opened in response to a request to invoke the service. For example, in order to invoke additional mapping services for creating a loss location for a claim, a user can press a "map it" button in the parent frame, which causes the second frame to be opened and displayed in-line with the parent frame in the browser window.

In some embodiments, configuring the second frame includes generating one or more hidden items. A hidden item comprises a staging area/communication corridor that is used to hold objects to be communicated between the first and second frames. As one example, an html text input field located in the page of the parent frame whose visibility has been turned off can be used as a hidden item. The hidden items are configured to include representations of objects such as JSON objects that store a set of parameters to be communicated. In some embodiments, the generated hidden items of the parent frame include a hidden outbox and a hidden inbox.

In some embodiments, the hidden outbox is an outbox that is configured to provide information to the iframe from the parent frame, which may in turn use the information to render the display of the iframe (e.g., use the initialization information in a request to an external service to display an initial map). For example, when the second frame is first displayed, the outbox can be configured to include initialization information used to render the initial base display of the iframe. In some embodiments, a hidden inbox included in the parent frame is configured to store information received from the child frame to be transferred to the parent frame. In some embodiments, the parent and child frames are configured to package parameters into objects to be stored in the hidden fields/items (e.g., serialize and translate parameters into a JSON object) as well as unpackage/reconstitute the objects stored in the hidden fields/items.

In some embodiments, configuring the second frame includes obtaining authenticated content. The authenticated content can include content generated by a central host component 218 of FIG. 2. The content can be generated in response to the client requesting the content having been authenticated (e.g., by having credentials being verified by the central host component via a proxy such as proxy 216 of FIG. 2), and the content can also be obtained from the central host component via the proxy as well. The generated content can include logic such as scripting code (e.g., combination of javascript and html) for rendering the iframe. If a further external service (e.g., third party mapping engine) is to be interacted with via the second frame, any API (application programming interface) code required to be executed to perform queries, requests, functions, etc. on the third party engine, as well as any required license keys (which may be held by the central host component), can also be included as part of the customized rendering/interaction code. In some embodiments, communication between the iframe and the third party engine is facilitated by a proxy such as proxy 216 of FIG. 2, with the proxy, for example, performing API calls/fetches, queries, etc. to the third party mapping engine on behalf of the iframe, as well as delivering content to the iframe. In some embodiments, the customized rendering code comprises a mashup of multiple elements (e.g., functions) from various sources that are combined together using custom code so that the elements can be integrated together to form an application that can be interacted with within the same display and UI.

At 306, the second frame is rendered using the authenticated content and the hidden item. For example, the authenticated content received from the central host via the proxy can be executed and take as input initialization information included in the hidden outbox of the parent frame to render a starting/base display of the iframe.

At 308, a user input is received with respect to the second frame. For example, after a base display has been rendered in the iframe, a user can interact with the embedded UI that is rendered inline with the browser window to perform an insurance-related transaction. In an example scenario in which a third party mapping engine is invoked, a map can be displayed in the second frame which a user can navigate and place markers on to indicate locations of risk items/units, the functionality of which is provided by the custom rendering scripting code described above.

At 310, a second hidden item is updated. In some embodiments, the second hidden item that is updated is an item stored in a hidden inbox of the parent frame that is to be communicated from the child iframe to the parent frame of the browser. The second hidden item can be updated in respect the user input received with respect to the second frame. For example, upon interacting with the service/application rendered in the second frame, results received from the external service on the second domain are packaged according to the scripting code provided to the iframe and placed in the hidden inbox to be retrieved by the parent frame.

At 312, in response to a user input to update, data from the second hidden item is obtained and a transactional object used in the insurance-related workflow is updated. For example, in response to a user indicating that they have completed using the external third party service rendered in the second frame, the parent frame, in which the insurance-related workflow of an on-premises application is running, is configured to retrieve the JSON object placed in the hidden inbox by the child frame, reconstitute (e.g., deserialize) the object, and apply the information to a transactional object (e.g., object representing an insurance claim or any other appropriate insurance related object) used in the insurance-related workflow. In some embodiments, the information is applied to the transactional object in memory. In some embodiments, the information is applied to the transaction object in a manner that does not cause the updated object to become legally bound.

Figure 4:
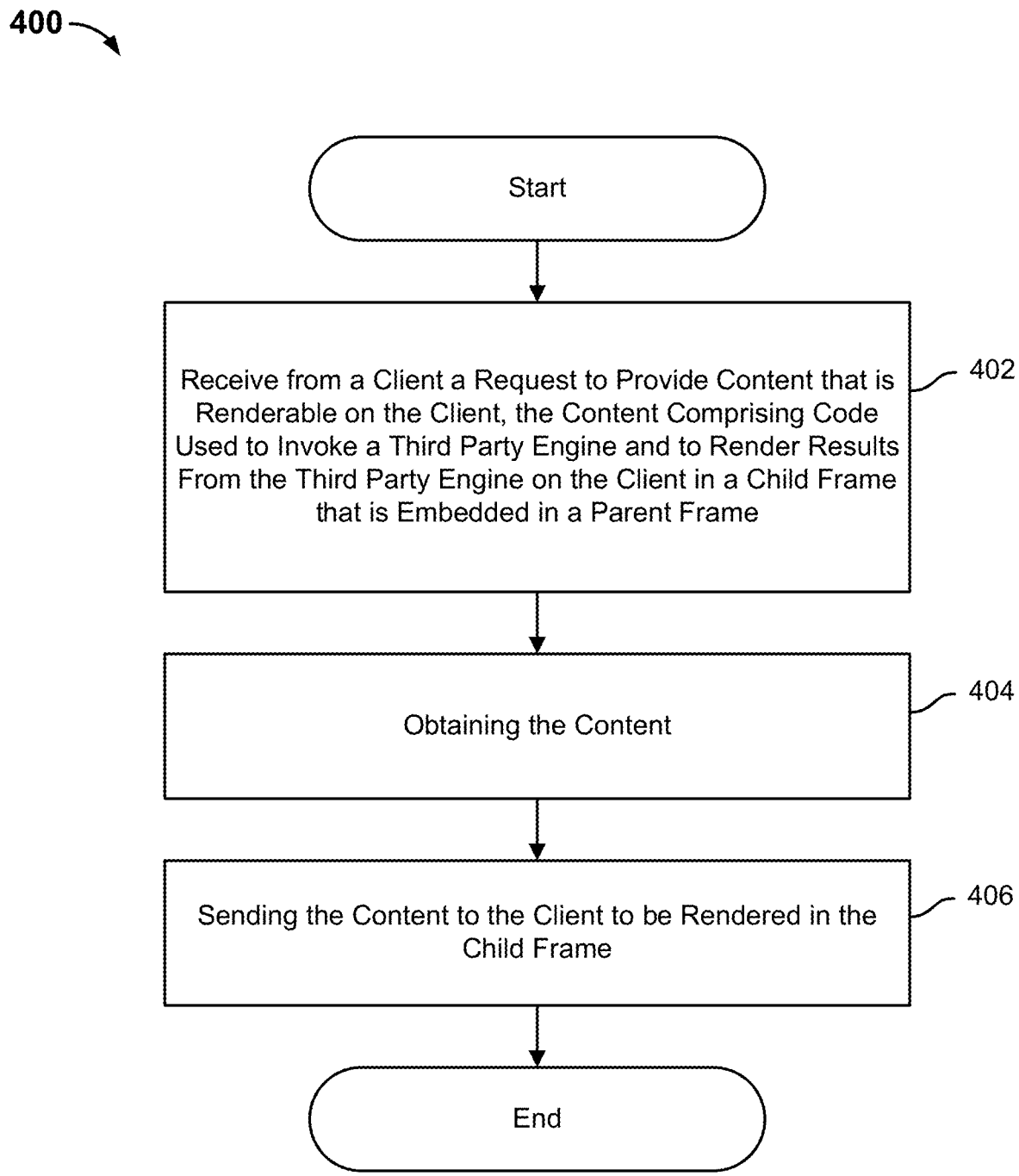
FIG. 4 is a flow diagram illustrating an embodiment of a process for interframe communication during an insurance-related workflow.

FIG. 4 is a flow diagram illustrating an embodiment of a process for interframe communication during an insurance-related workflow. In some embodiments, process 400 is performed by proxy 216 and central host component 218 of FIG. 2. The process begins at 402 when a request to provide content that is renderable on a client is received from the client, the content including code use to invoke a third-party engine and to render results from the third-party engine on the client in a child browser frame that is embedded in a parent browser frame of a browser window. In some embodiments, the request is forwarded by a proxy such as proxy 216 of FIG. 2, on behalf of the client, to a central host component on a domain different from that of the parent frame. In some embodiments, the request includes credentials that are authenticated by the central host component to verify that the client is permitted to receive the requested content.

At 404, the content is obtained. In some embodiments, the content includes authenticated content that is generated by and received from a central host component such as central host component 218 of FIG. 2. In some embodiments the generated content includes customized code (e.g., combination of javascript, html, etc.) for rendering the iframe. In some embodiments, the customized rendering code includes code that is a mashup that combines and ties together various elements (e.g., API code from various sources such as third party engines) into a browser-based application that can be displayed in the iframe embedded within the parent frame and inline of the client browser instance. In some embodiments, the customized rendering code includes license keys or any other authentication mechanism for fetching portions of an API (application programming interface) of a third party engine.

At 406, the content is sent to the client to be rendered in the child frame. In some embodiments, the content generated by and received from an external service provider such as a central host component on an external domain is passed, via a proxy, to the client browser iframe. The client browser frame is then configured to execute the content which causes the iframe to be rendered according to the authenticated content.

Processing Insurance Related Address Information

Figure 5A:
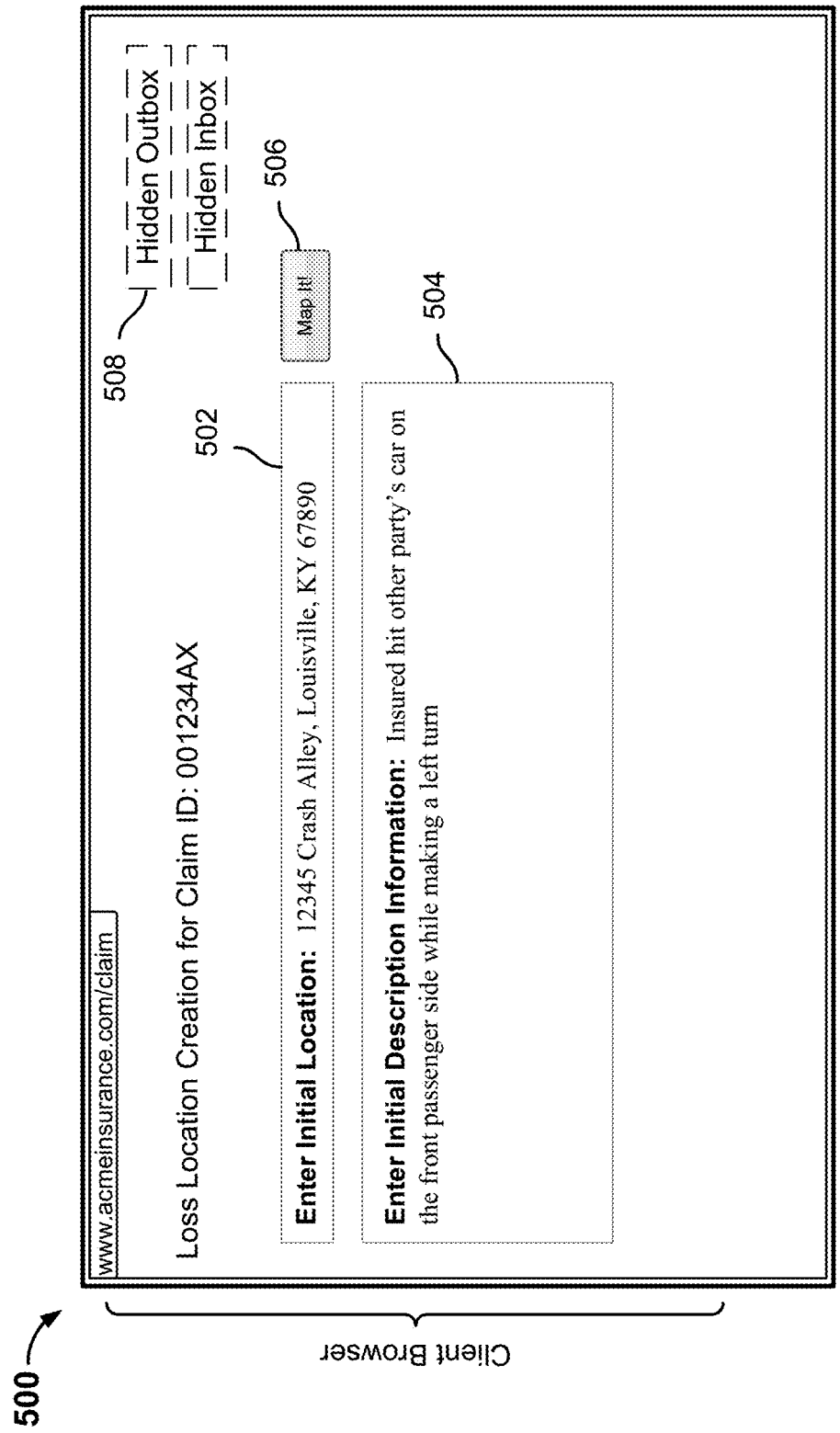
FIG. 5A is a diagram illustrating an embodiment of a user interface for interframe communication during an insurance-related workflow.
Figure 5B:
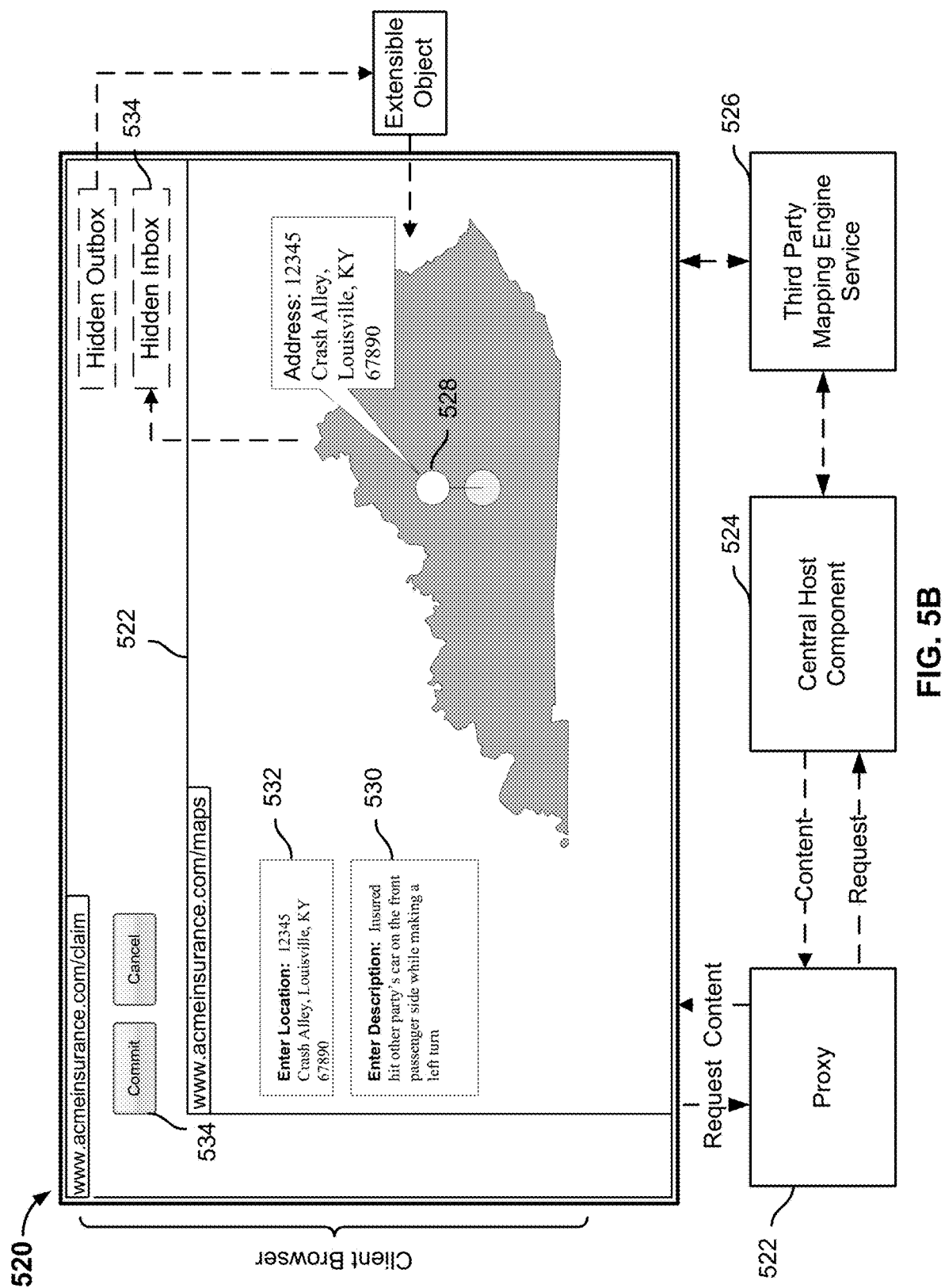
FIG. 5B is a diagram illustrating an embodiment of a user interface for interframe communication during an insurance-related workflow.

As one example scenario, the infrastructure described above can be used to integrate mapping functionality of a third party mapping engine into an on-premises insurance claim processing workflow. FIGS. 5A and 5B are diagrams illustrating embodiments of user interfaces for using a mapping application hosted in the cloud to perform a loss location creation transaction as part of a claim processing workflow running on an on-premises installation.

In the example user interface of FIG. 5A, an adjustor, in order to process a claim for an automobile accident, opens an on-premises browser-based claim processing application in client browser 500. The parent frame of the client browser window instance is directed to the URL for accessing the on-premises application, with the URL under the domain of the insurer for which the adjustor works for (e.g., "www.acmeinsurance.com/claims"). The browser-based application is accessible via a UI displayed within a parent frame of the client browser window instance.

As part of the claim processing workflow, the adjustor creates a loss location for the accident claim (i.e., record and describe location of accident) by invoking, from the parent frame, an application that leverages a third party mapping engine, where the application is hosted in the cloud on an Internet domain that is different from the Internet domain of the parent frame. In this example, before invoking the hosted mapping service, the adjustor enters a starting address (502) and description (504) of the accident in the parent frame of the browser. For example, the user has indicated a starting address of "12345 Crash Alley, Louisville, Ky. 67890" with a description describing the accident as "insured hit other party's car on the front passenger side while making a left turn." The user then presses a button (e.g., "Map It!" button 506) requesting that the mapping service be invoked. In the example shown, in response to invoking the mapping functionality, the parent frame packages the starting address, initial description, and any other appropriate information (e.g., read-write/editing permissions and other properties inherited from the parent frame) into a JSON extensible object that is placed in hidden outbox 508.

Continuing with the example of FIG. 5A, in FIG. 5B, in response to the invocation, an iframe (522) that is embedded within the parent frame is opened and directed to a page on the same domain of the parent frame. In this example, the iframe URL is set to a subpage of the insurer's "acmeinsurance" domain (e.g., "www.acmeinsurance.com/maps") such that the parent frame and the child iframe are on the same domain.

In some embodiments the page that the iframe is directed to is configured (e.g., hardcoded) to contact a proxy (522), which is installed along with the on-premises application installation. The proxy is instructed to make a remote proxy call on behalf of the iframe to request authenticated content hosted on a cloud entity such as central host component 524. The authenticated content includes customized rendering code for rendering a mapping application element to be integrated into the on-premises claim processing workflow. In some embodiments, as part of the request, the proxy server can also provide authentication credentials to the cloud entity which are used to verify, for example, that the insurer associated with the on-premises installation requesting the mapping service is permitted to use the service.

In the example shown, in response to the insurer having been authenticated and verified, authenticated content, which includes customized rendering code (e.g., combination of javascript code, html, etc.) that includes the logic and instructions for rendering the iframe as described above, is generated by the cloud entity and provided to the iframe via the proxy.

In some embodiments, the content can include custom mashup code that integrates/combines the functionality provided by a third-party mapping engine (e.g., mashup integration of third-party mapping engine API functions) into a custom mapping application usable to provide mapping services. The mapping application service can then be accessed/interacted with via a UI component that is rendered in the iframe according to the content generated by the cloud entity. The hosted mapping application can then be used to support the transaction of creating the loss location for the accident claim.

In various embodiments, the facilities and functionality supported by the authenticated content by leveraging the mapping functionality (e.g., via API calls) of the third party mapping engine can include displaying a map, providing the ability to drag and drop markers on locations, providing the ability to select between viewing layers (e.g., satellite view, map view, topographical view, street view, etc.), providing the ability to zoom in and out at different levels of the map, providing text input fields such as description fields and location fields with automatic address completion/fuzzy search that are linked to the displayed map, etc The authenticated content passed to the iframe via the proxy can also include any license keys obtained from a third party mapping engine service (526) such as Google Maps™ that are required to fetch the API (application programming interface) for the mapping engine. The authenticated content can include custom code for rendering the iframe. In some embodiments, the custom code is configured to combine the various facilities and elements provided by the third party engine together into an application/service useable by the user that is also configured to be integrated into the workflow of the on-premises application installation.

In the example shown, the custom rendering code generated by the central host component is provided back to the client iframe via the proxy. The iframe is then configured to execute the received code and render its display accordingly. In this example, as part of rendering the display of the iframe, the received custom code is configured to extract the object (which includes initialization information provided by the user in the parent frame) embedded by the parent frame in the hidden outbox, whose location is known to the custom code, and render the base/starting display of the iframe. In this example, the custom code extracts the starting address ("12345 Crash Alley, Louisville, Ky. 67890") from the hidden object and renders a map of Kentucky with a pin placed at the starting address (528). In the example shown, the initial description information ("insured hit other party's car on the front passenger side while making a left turn") is also extracted from the hidden object and used to populate the location description field 530. In some embodiments, the custom code is also configured to place the initial base display of the map to a particular zoom level as well. In some embodiments, obtaining information from the hidden field requires the use of a key, one time use token, or any other appropriate secure mechanism.

As the custom code includes code for integrating various mapping functionality of the third party engine (e.g., by querying and tying together, using custom code, components retrieved when fetching portions of the API from the third party engine) into an application that the user can interact with via an additional UI component, the adjustor can navigate the rendered map and view the surroundings of the crash (e.g., via street view, satellite view, etc.) to visually assess and provide additional contextual information about the crash and update the description (530) of the accident. For example, via the map interface, the adjustor can use satellite and street view imagery to determine that the particular parking lot entrance at which the accident occurred has a severe blind spot) and update the description field for the loss location of the claim accordingly. In some embodiments, communication between the iframe and the third party engine is facilitated by a proxy such as proxy 216 of FIG. 2, with the proxy, for example, performing API calls/fetches, queries, etc. to the third party mapping engine on behalf of the iframe, as well as delivering content to the iframe.

Additionally, while the pin indicating the location of the crash was placed at the initial starting address, the user can move the pin to a more precise location (or add additional pins as well). For example, if the address is for a sports stadium, the pin can be moved to the particular parking lot that the accident occurred in, with the corresponding coordinates of the pin determined so that a more accurate location of the accident can be provided. In some embodiments, if a pin is moved to a new set of coordinates that are associated with another address, the address field (532) can be updated accordingly, for example, by reverse geocoding the coordinates corresponding to the moved pin location to determine the associated address.

After completing the loss location creation transaction using the mapping service, the adjustor can then commit (e.g., by clicking on "commit" button 534) and transfer the results of the transaction (e.g., updated accident address and description information) from the iframe to the parent frame running the on-premises insurance-related workflow and complete the transaction to return to the parent frame. For example, the updated address, description information, etc. can be recorded to the open claim being processed in the on-premises claim application running in the parent frame.

In this example, the custom javascript code packages (e.g., serializes) the updated address information, the updated description information, and any other information to be passed to the parent frame into an extensible object that is placed in a hidden inbox of the parent frame, whose location is known to the custom rendering code. In some embodiments, the extensible object placed in the hidden inbox (534) is updated dynamically as the user interacts with the UI component rendered in the iframe, with the last object in the inbox committed when the user indicates that they have completed the iframe transaction. Upon completion, the iframe can then be closed, and the parent frame is configured to extract the information passed from the iframe via the hidden inbox and persist the information on the on-premises installation, for example, by applying the newly updated location and description information into a claim object representing the claim being processed in the insurance workflow. In some embodiments, the information is applied to the claim object in memory, so that the claim object is not legally bound.

The transient information and additional context resulting from leveraging the functionality provided by using the mapping service can then be persisted and used in downstream processing, for example, allowing the adjustor to immediately begin downstream processing such as the subrogation process. Other downstream processing of the on-premises installation that can also leverage the persisted information can include risk concentration analysis. For example, using precise coordinate information about automobile accidents, the concentration (e.g., particular stretches of freeways, particular turns, etc.) of accidents and the risk of an accident occurring in a particular area can be determined. Another example of downstream processing that can leverage the persisted and accurate mapping information that is obtained using the mapping service includes fraud detection, where fraud rings can be determined based on the concentration of where fraud has occurred.

Thus, using the infrastructure described above, the loss location creation transaction performed as part of the insurance-related workflow can be spread across multiple Internet domains, such that the latest mapping technology can be leveraged to augment on-premises insurance applications (which do not natively support mapping functionality). Additionally, as the rendered iframe for leveraging the hosted mapping service is embedded inline of the browser window, the integration of the mapping service appears seamless to the user as well. The information and results determined from interacting with and leveraging external sources of information can then be persisted on the on-premises installation for further downstream processing.

In the example scenario above, the adjustor utilized the mapping service to create a loss location. In some embodiments, the iframe inherits properties, such as read-write permissions, of the parent frame. For example, rather than create a loss location, an adjustor may wish to review a claim that has already been bound, and thus the workflow presented in the parent frame is read-only. The adjustor can then view the loss location of the claim by using the mapping service and having a map with a marker indicating the position of the loss location displayed in an iframe. As the workflow being processed is read-only, the iframe is configured to inherit the readability property as well, such that the user is not allowed to change information such as the loss location and description of the claim. However, other functionality, such as the ability to view street view imagery, satellite imagery, etc. can still be permitted.

FIG. 6 is a diagram illustrating an embodiment of a hidden item. In this example, an extensible JSON object placed in a hidden outbox of a parent frame is shown. Various parameters that have been packaged and serialized into the JSON object to be sent to the iframe include the name of the application running in the parent frame from which the iframe was invoked, the editing properties of the iframe (which can be inherited from the parent frame), the username of the app user, the starting address, the version of the application being run in the parent frame, the initial description entered in the parent frame, an initial zoom level, starting coordinates, language, etc. Any other appropriate parameters can be included in the object. The object shown is placed in the hidden outbox of the parent frame, indicating that the object includes information to be communicated from the parent frame to the iframe to be rendered. Similarly, an extensible object for communicating information from the iframe to the parent frame can be generated by the iframe (e.g., via custom rendering code) and placed in a hidden inbox of the parent frame.

Figure 7:
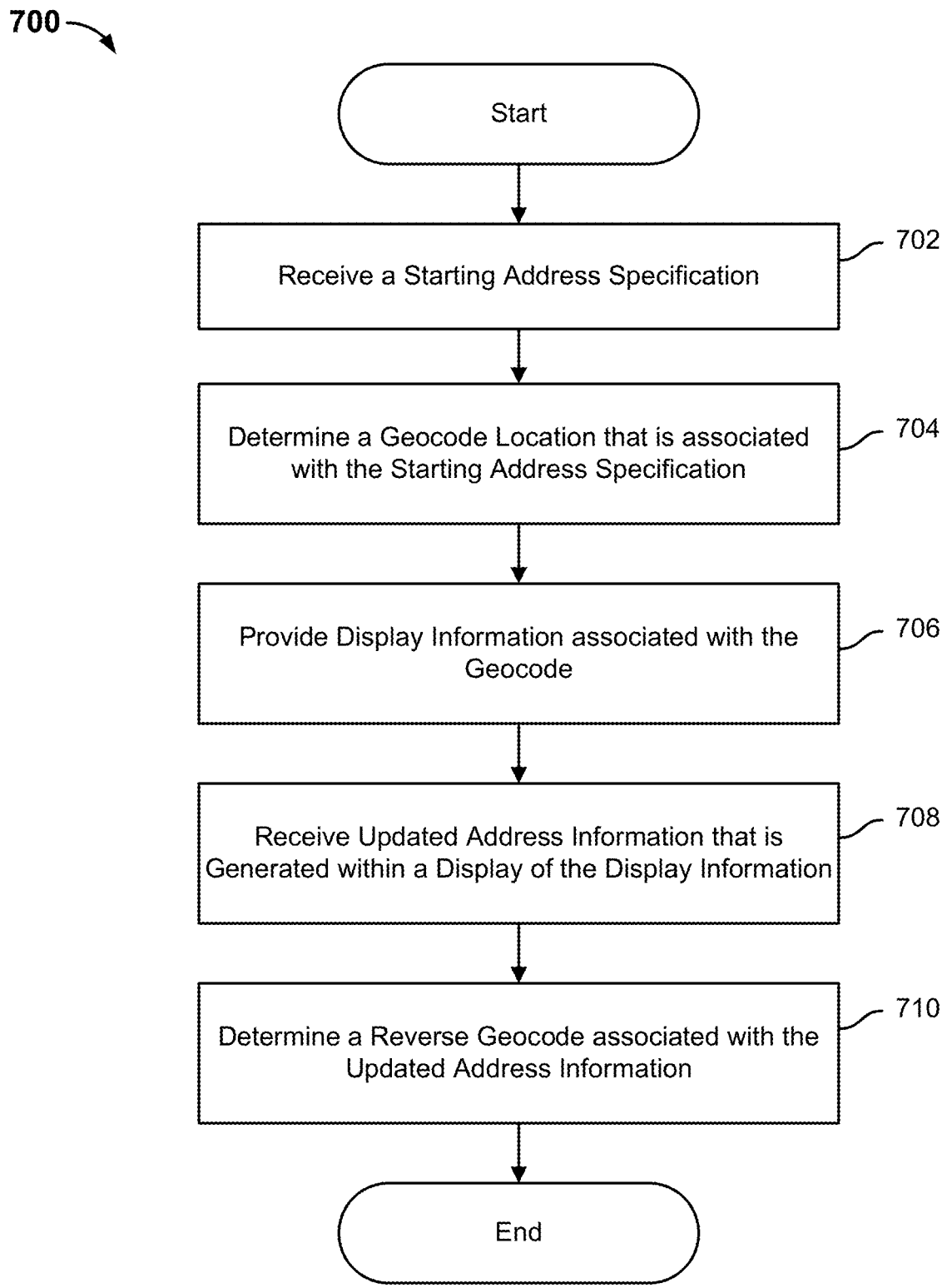
FIG. 7 is a flow diagram illustrating an embodiment of a process for processing insurance-related address information.

FIG. 7 is a flow diagram illustrating an embodiment of a process for processing insurance-related address information. In some embodiments, process 700 is performed by client 204 of FIG. 2 via the user interfaces of FIGS. 5A and 5B. In some embodiments, code to execute process 700 is downloaded to the browser from an on-premises application installation (e.g., installed application component 202 of FIG. 2) as well as a cloud component (e.g., central host component 218 of FIG. 2) via a proxy (e.g., proxy 216 of FIG. 2). The process begins at 702 when a starting address specification is received. For example, via a user interface, a user can input a starting address for a displayed map to be centered on initially. In some embodiments, if starting address specification is not provided by the user, a default starting address (e.g., the address representing the center of the country that the user is in) can be received.

At 704, a geocode location that is associated with the starting address specification is determined. In some embodiments, geocoding includes translating the starting address into coordinates (e.g., latitude/longitude). In some embodiments, the determination is performed by providing the starting address specification in a query to a third party engine (e.g., Google Maps™ engine) and receiving a corresponding set of coordinates. In some embodiments, the query is made by invoking an API call that is made available via custom code/logic (e.g., javascript, html code, etc.) that is provided for rendering the browser UI of the client.

At 706, display information associated with the geocode is provided. In some embodiments, the display information is provided in-line with a browser window displaying a portion of the workflow. In some embodiments, a UI for the overall insurance-related workflow is displayed in a parent frame of the browser window, while an additional UI component for accessing/leveraging a third-party engine for processing the insurance-related address information is rendered in an iframe embedded within the parent frame. The display information can include a map rendered in the iframe that is centered about the coordinates of the starting address (i.e., latitude/longitude that were determined by geocoding the starting address). A description field in the iframe for entering description information can also be pre-populated with an initial description (if provided).

At 708, updated address information that is generated within a display of the display information is received. As one example, the user can place/move a pin on the displayed map indicating the physical location of a risk item to be insured. Coordinates corresponding to the pin location on the displayed map can then be determined. Any number of pins can be placed by the user. For example, if a user is recording the risk items on a farm property that several thousands of acres, the user can navigate a satellite view of the farm property and place pins on each of the buildings and items to be insured by the policy for the farm property (e.g., water wells, barns, silos, etc.) as well as provide any appropriate description for each of the risk items marked.

At 710, a reverse geocode associated with the updated address information is determined. For example, given the coordinates of the pin placed by the user, an API query can be made out to the mapping engine to determine the address associated with the coordinates. The resulting location address can then be passed to an insurance related workflow from which the mapping service invoked and used in insurance-related downstream processing.

Interframe communication relating to an insurance workflow has been described. The techniques described above permit secure cross-domain and interframe communication between frames in a single browser window instance that are directed to web pages/documents that are hosted on different Internet domains.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for inter-frame communication during an insurance related workflow, comprising:
a processor configured to:
receive from a client a request to provide executable content that is renderable on the client, the executable content comprising computer instructions used to invoke a third party engine and to render results from the third party engine on the client in a child frame that is embedded in a parent frame, wherein the parent frame and the child frame embedded in the parent frame are directed to a same first domain;
in response to receiving the request, obtain, on behalf of the child frame, the executable content, wherein the executable content is hosted on a remote entity associated with a second domain different from the first domain to which the parent frame and the embedded child frame are both directed; and
send the executable content to the child frame of the client to render, for visual display, a portion of the child frame that is directed to the same first domain as the parent frame, wherein the executable content obtained from the remote entity associated with the second domain different from the first domain, when executed by the child frame directed to the same first domain as the parent frame in which the child frame is embedded, is configured to extract a set of parameters from a hidden outbox in the parent frame directed to the first domain to which the embedded child frame is also directed, wherein the hidden outbox comprises a hidden field located in the parent frame that is used to provide information from the parent frame to the embedded child frame wherein a key is used to access the hidden outbox and extract the set of parameters from the hidden outbox, wherein the executable content is configured to extract the set of parameters at least in part by unpackaging an object placed in the hidden outbox by the parent frame wherein the parent frame further includes a hidden inbox comprising a hidden field used to transfer information from the embedded child frame to the parent frame and wherein the executable content is configured to pass information from the child frame to the parent frame at least in part by storing the information to be passed in the hidden inbox in the parent frame in response to a user input associated with the child frame; and a memory coupled to the processor and configured to provide the processor with instructions.

2. The system recited in claim 1, wherein the parent frame is associated with a first URL associated with the first domain.

3. The system recited in claim 2, wherein the child frame is an iframe associated with a second URL under the same first domain as the first URL.

4. The system recited in claim 2, wherein the executable content is hosted on a domain different from a domain associated with the first URL.

5. The system as recited in claim 1, wherein the processor is further configured to forward, on behalf of the client, the request to an external entity hosting the executable content.

6. The system recited in claim 5, wherein the processor is further configured to send, to the remote entity hosting the executable content, a set of credentials associated with the client.

7. The system recited in claim 6, wherein the remote entity is configured to authenticate the client based at least in part on the sent set of credentials.

8. The system of claim 7, wherein the executable content is obtained in response to the client having been authenticated.

9. The system recited in claim 1, wherein the executable content includes code for executing a portion of an API associated with the third party engine.

10. The system as recited in claim 9, wherein the executable content includes a license used to obtain the portion of the API associated with the third party engine.

11. The system as recited in claim 1, wherein the set of parameters extracted from the hidden outbox comprise initialization parameters, and wherein the client is configured to render the child frame based at least in part on the initialization parameters extracted from the hidden outbox in the parent frame.

12. The system as recited in claim 11, wherein the executable content includes code for retrieving the initialization parameters.

13. The system as recited in claim 11, wherein the key used to access the hidden outbox in the parent frame is included in the executable content.

14. The system as recited in claim 1, wherein the client is configured to obtain data from the hidden inbox in the parent frame and update a transactional object used in the insurance related workflow.

15. A method of inter-frame communication during an insurance related workflow, comprising:

receiving from a client a request to provide executable content that is renderable on the client, the executable content comprising computer instructions used to invoke a third party engine and to render results from the third party engine on the client in a child frame that is embedded in a parent frame, wherein the parent frame and the child frame embedded in the parent frame are directed to a same first domain;

in response to receiving the request, obtaining, on behalf of the child frame, the executable content, wherein the executable content is hosted on a remote entity associated with a second domain different from the first domain to which the parent frame and the embedded child frame are both directed; and sending the executable content to the child frame of the client to render, for visual display, a portion of the child frame that is directed to the same first domain as the parent frame, wherein the executable content obtained from the remote entity associated with the second domain different from the first domain, when executed by the child frame directed to the same first domain as the parent frame in which the child frame is embedded, is configured to extract a set of parameters from a hidden outbox in the parent frame directed to the first domain to which the embedded child frame is also directed, wherein the hidden outbox comprises a hidden field located in the parent frame that is used to provide information from the parent frame to the embedded child frame, wherein a key is used to access the hidden outbox and extract the set of parameters from the hidden outbox, wherein the executable content is configured to extract the set of parameters at least in part by unpackaging an object placed in the hidden outbox by the parent frame, wherein the parent frame further includes a hidden inbox comprising a hidden field used to transfer information from the embedded child frame to the parent frame and wherein the executable content is configured to pass information from the child frame to the parent frame at least in part by storing the information to be passed in the hidden inbox in the parent frame in response to a user input associated with the child frame.

16. A computer program product for inter-frame communication during an insurance related workflow, the computer program product being embodied in a non-transitory computer readable storage medium and comprising computer instructions for:

receiving from a client a request to provide executable content that is renderable on the client, the executable content comprising computer instructions used to invoke a third party engine and to render results from the third party engine on the client in a child frame that is embedded in a parent frame, wherein the parent frame and the child frame embedded in the parent frame are directed to a same first domain;

in response to receiving the request, obtaining, on behalf of the child frame, the executable content, wherein the executable content is hosted on a remote entity associated with a second domain different from the first domain to which the parent frame and the embedded child frame are both directed; and send the executable content to the child frame of the client to render, for visual display, a portion of the child frame that is directed to the same first domain as the parent frame, wherein the executable content obtained from the remote entity associated with the second domain different from the first domain, when executed by the child frame directed to the same first domain as the parent frame in which the child frame is embedded, is configured to extract a set of parameters from a hidden outbox in the parent frame directed to the first domain to which the embedded child frame is also directed, wherein the hidden outbox comprises a hidden field located in the parent frame that is used to provide information from the parent frame to the embedded child frame wherein a key is used to access the hidden outbox and extract the set of parameters from the hidden outbox, wherein the executable content is configured to extract the set of parameters at least in part by unpackaging an object placed in the hidden outbox by the parent frame wherein the parent frame further includes a hidden inbox comprising a hidden field used to transfer information from the embedded child frame to the parent frame and wherein the executable content is configured to pass information from the child frame to the parent frame at least in part by storing the information to be passed in the hidden inbox in the parent frame in response to a user input associated with the child frame.

17. The system recited in claim 3, wherein a page at the second URL to which the child frame is directed is configured to instruct a proxy to make, on behalf of the child frame, a remote proxy call to the remote entity associated with the second domain for the executable content.

* * * * *